Jan. 16, 1923.
F. R. WARN ET AL.
SHUTTER LOCKING ATTACHMENT FOR CAMERAS.
FILED MAY 13, 1920.
1,442,373.
3 SHEETS—SHEET 1.
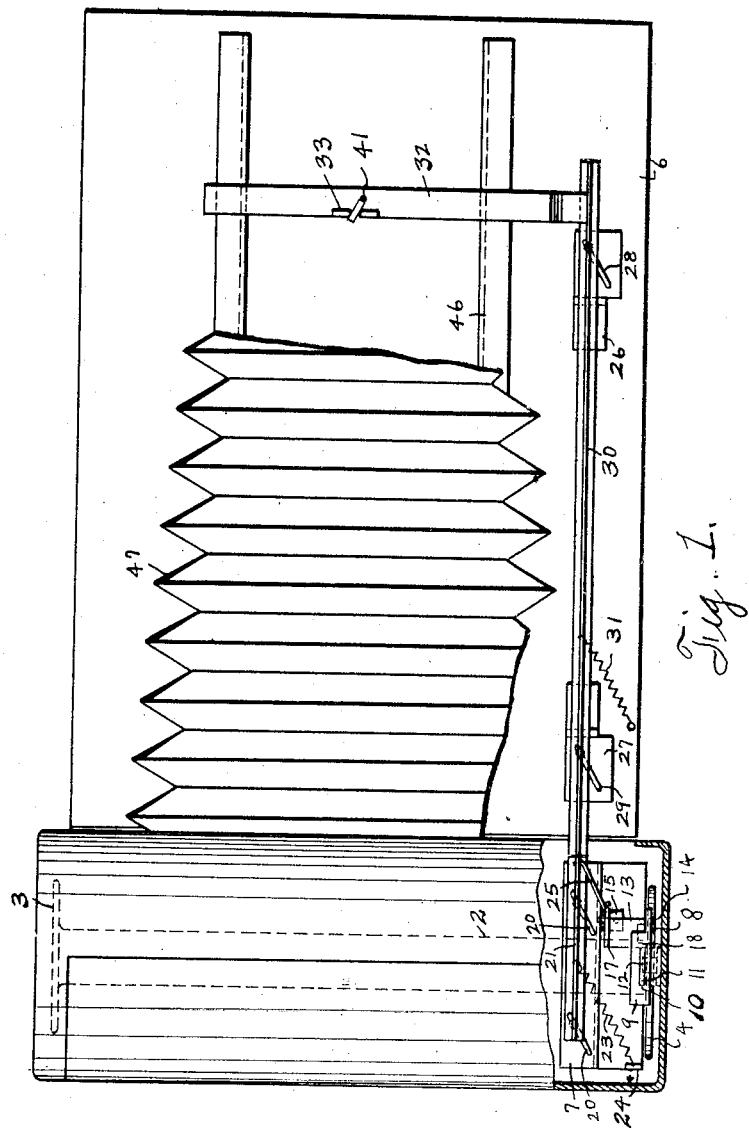
INVENTORS
Frederick R. Warn
Paul C. Jackson
BY
Hardway & Cathey
ATTORNEYS

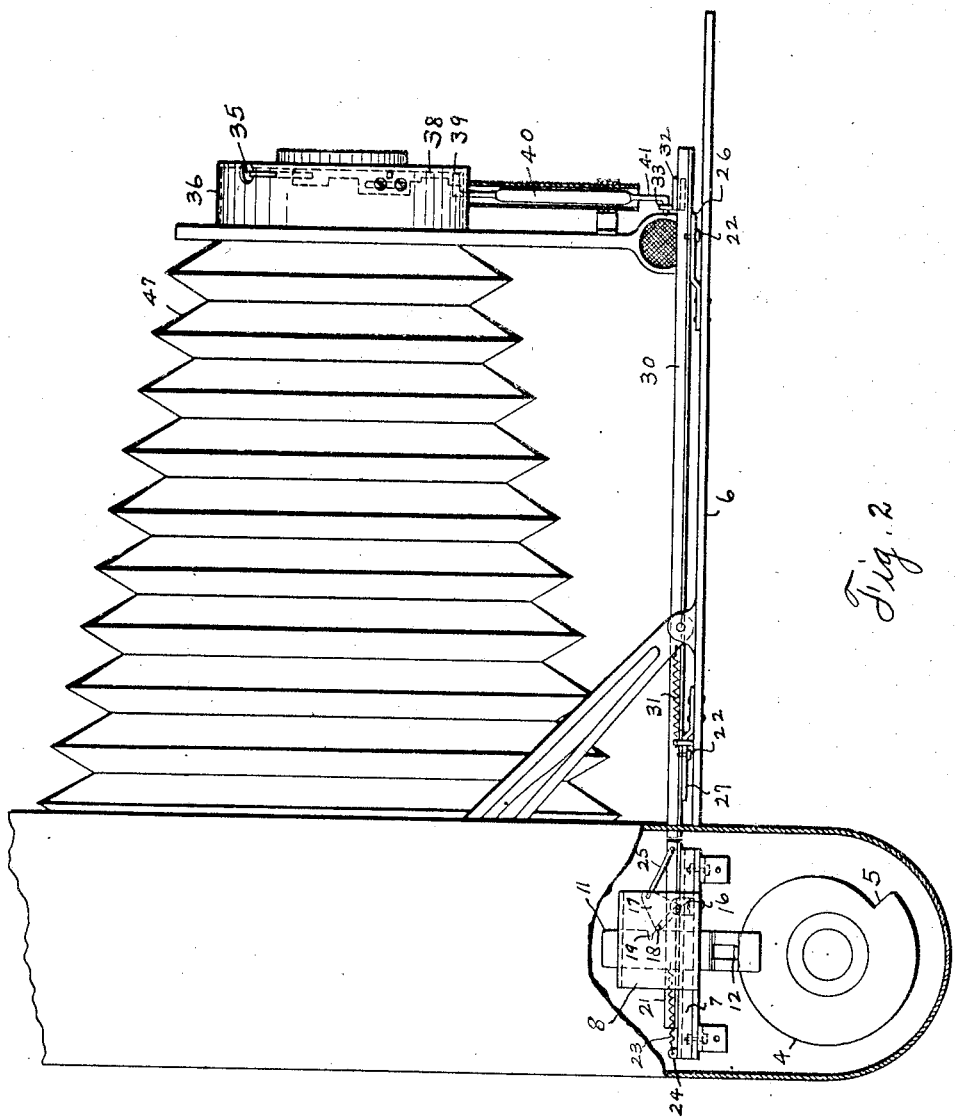

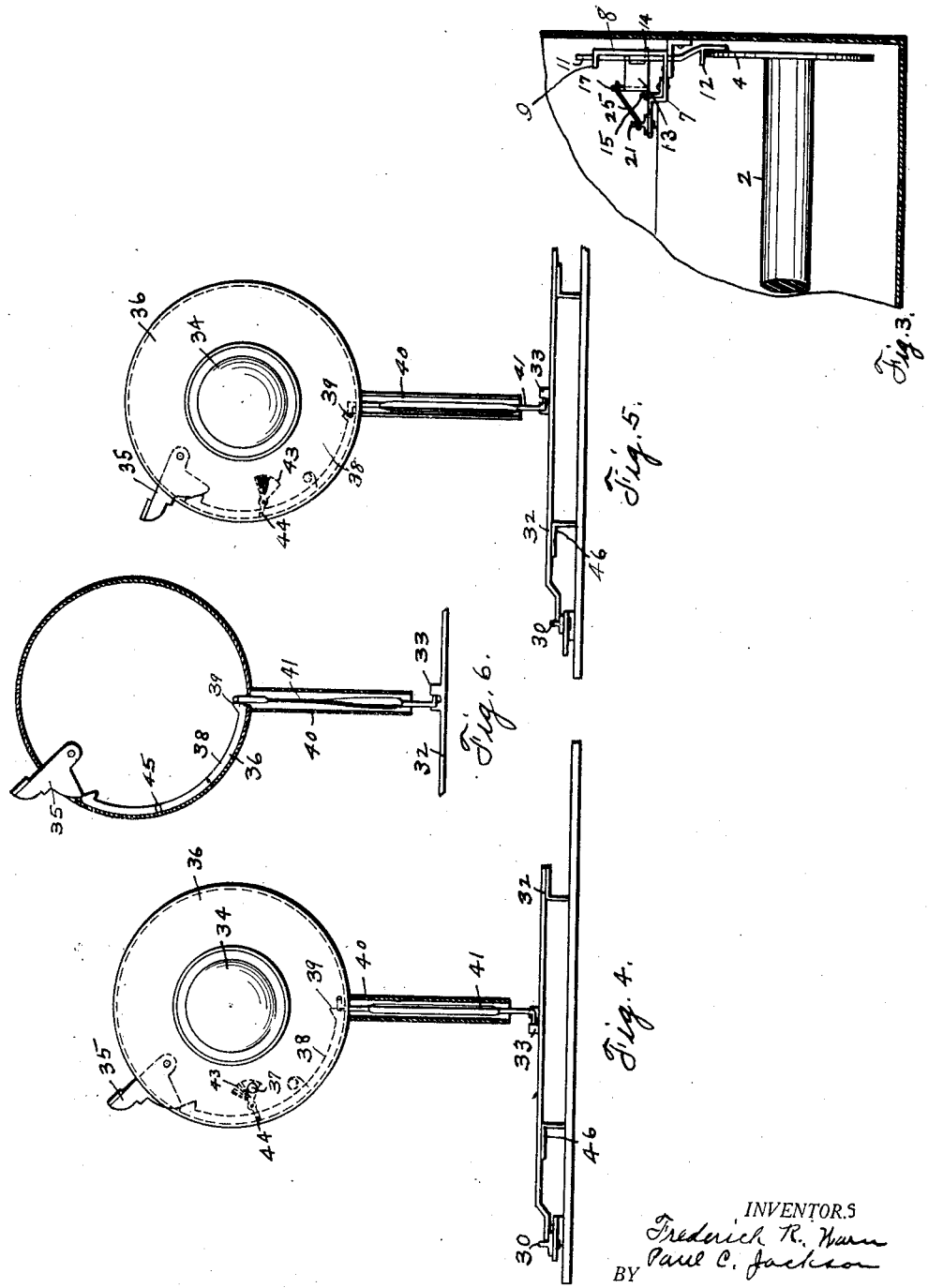

Patented Jan. 16, 1923.

1,442,373

UNITED STATES PATENT OFFICE.

FREDERICK R. WARN AND PAUL C. JACKSON, OF HOUSTON, TEXAS.

SHUTTER-LOCKING ATTACHMENT FOR CAMERAS.

Application filed May 13, 1920. Serial No. 381,177.

*To all whom it may concern:*

Be it known that we, FREDERICK R. WARN and PAUL C. JACKSON, citizens of the United States, residing at Houston, in the county of Harris and State of Texas, have invented certain new and useful Improvements in a Shutter-Locking Attachment for Cameras, of which the following is a specification.

This invention relates to new and useful improvements in a shutter locking attachment for cameras.

One object of the invention is to provide an attachment of the character described which will prevent a double exposure, in other words which will permit the shutters to be opened only once to expose the film and thereafter the shutter operating mechanism will be automatically locked until another film is brought into position for exposure.

Another object of the invention is to provide an attachment of the character described which is provided with an indicator which will readily show whether an exposure of the film has been made or not.

With the above and other objects in view the invention has particular relation to certain novel features of construction, operation and arrangement of parts, an example of which is given in this specification and illustrated in the accompanying drawings, wherein, Figure 1 is a plan view of the camera, partially in section, Figure 2 shows a side view, partially in section, Figure 3 shows a fragmentary sectional view looking from the rear.

Figure 4 shows a fragmentary front view, partially in section, showing the locking mechanism in released position.

Figure 5 shows a fragmentary front view, partially in section, showing the locking mechanism in locked position, and, Figure 6 shows a fragmentary sectional view showing the locking mechanism under tension and ready to operate.

Referring now more particularly to the drawings wherein like numerals of reference designate similar parts in each of the figures, the numeral 1 refers to the camera casing of the usual form and the numeral 2 designates the lower film-spool from which the film is wound on to the upper film spool (not shown). The spool 2 has the disclike end flanges 3 and 4, the latter of which has the marginal notch 5, as shown in Figure 2. The numeral 2 designates a hinged platform, which is opened into right angular position as shown in Figure 2, when the camera is in use and which may be closed, when the camera is not in use, to enclose the mechanism within the casing.

Fixed within the casing above the spool 2 there is a supporting plate 7, the outer edge of which has the upstanding guide plate 8, formed integrally therewith and whose upper edge is overturned forming the guide flange 9 which has a slot 10 cut therethrough, forming a bearing for the vertical lift bar 11 which plays therethrough. The lower end of this bar fits against the outer side of the flange 4 and carries an overturned lug 12 which rides on the margin of said flange. The numeral 13 designates a rocker-plate, whose front edge has the extended pins 14, 14 projecting out away from the ends thereof, one of which operates in an upstanding bearing 15, carried by the plate 7 and the other of which operates in a bearing 16 through the guide plate 8. The inner end of the locking plate 13 is turned upwardly and formed into a lever 17 and the outer end thereof has a projecting pin 18 which works through a marginal notch 19 in the forward edge of the lift bar 11. Accordingly, as the lift bar 11 is moved up and down the plate 13 will be rocked and the lever 17 will be oscillated back and forth.

The outer edge of the supporting plate 7 is formed into a track, through which the slots 20, 20 are cut and mounted upon this track there is the rear actuating bar 21 which is anchored by means of set screws similar to the set screw 22, shown in Figure 2. These set screws pass through the slots 20, and are screwed into the underside of the bar 21 and have enlarged heads which anchor the last mentioned bar in place, and this bar is held in retracted position by means of a coil pull spring 23, whose rear end is attached to the lug 24 carried by the rear end of the plate 7 and whose forward end is attached to the bar 21. The forward end of the bar 21 is connected to the lever 17 by means of a link 25, whose respective ends are pivoted to said lever and bar. On the platform 6 the front and rear guide plates 26 and 27 are fastened and these guide plates have the respective slots 28 and 29 cut therethrough. Mounted on these guide plates is the front actuating bar 30. This bar 30 is anchored in position by means of set screws 22, which pass through the slots 28 and 29 from beneath and are threaded into the underside of said bar and this bar is normally held in retracted or withdrawn position by means of the coil pull spring 31, one end of which is attached to the plate 27 and the other end of which is attached to said bar 30.

When a film is in position for exposure to take a picture, the rim 4 of the spool 2, contacting against the lug 12 will elevate the lift bar 11 which will operate, through the mechanism described to force the free end of the lever 17 forwardly and this in turn will act through the link 25 to force the rear actuating bar 21 forwardly into contact against the rear end of the front actuating bar, alined therewith and will force said last mentioned bar forwardly. The slots 20, 28 and 29 are cut diagonally as shown so that as the bars 21 and 30 move forwardly they will also move inwardly, in lateral direction and the front end of the bar 30 will be thereby moved against the adjacent end of the cross bar 32 arranged transversely across the front end of the platform 6. This cross bar has an upturned notched lug 33, provided for a purpose to be hereinafter specified. The numeral 34 designates the front lens of the camera which is normally closed by the well known shutters. These shutters are opened and closed through the well known shutter operating mechanism. In as much as this mechanism is of conventional form and well understood by those skilled in the art it has not been thought necessary to show the same in detail. It may be said however that when an exposure is desired the shutter operating mechanism is actuated by a thumb lever 35 and when actuated said mechanism will operate to quickly open and automatically close said shutters for the exposure. The shutter operating mechanism is confined within the housing 36, usually of circular form and in the front wall of this housing we have provided a small opening 37. Within the housing there is an arcuate locking bar 38 which is slidably mounted, one end of which lies adjacent the thumb lever 35 and the other end of which is upturned forming a bearing face 39. A tubular bearing 40 has its lower end anchored to the camera and its upper end lies adjacent the underside of the housing 36 and extending through this bearing there is a rod 41. The lower end of this rod is bent out at right angles and rests in the notch of the lug 33 and its upper end is bent over in the opposite direction and lies adjacent the face 39. A section 42 of said rod is flattened so as to give it a certain amount of torsional flexibility.

Pivoted within the housing 36 there is a segmental plate 43 whose front surface has different colors, preferably white and red as shown. This plate is pivoted within the housing and has an outwardly extending short arm 44 which works in a notch 45 cut in the front edge of the locking bar 38.

The operation of the attachment will now be described.

When it is desired to bring a new film in front of the lens 34 for an exposure the spool 2 is turned in the well known manner and when the film is alined in front of said lens the end disc 4 of the spool will be in position to hold the lift bar 11 in elevated position which will operate through the mechanism described to hold the actuating bars 21 and 30 in forward position and the front bar will have forced the cross bar 32 transversely placing rod 41 under tension, thus holding the upper over turned end thereof against the face 39 of the locking bar 38. This bar 38 however will not move by reason of the fact that its other end is in contact with the thumb lever 35 and the segmental plate 43 will show white through the opening 37 which will indicate that exposure has not been taken. If the lever 35 be now depressed it will operate through the shutter operating mechanism to suddenly open and close the shutters and expose the film, however when said lever 35 is depressed the locking bar 38 will be released from the position shown in Figure 6 and will move up to the position shown in Figure 5, thus moving the segmental plate 43 into position to show red through the opening 37 indicating that picture has been taken. When the thumb lever 35 is now released it can not return to its original position into engagement with the shutter operating mechanism, but will be locked against return by the adjacent end of the locking bar 38 as shown in Figure 4. A double exposure can not thus occur and by inspection through the opening 37 the operator can always tell whether the film has been exposed or not. After an exposure the spool 2 is then again turned to bring another film into position for an exposure. When the depression 5 registers with the lug 12 said lug will drop into said depression thus releasing the actuating bars 21 and 30 and they will be immediately retracted by the springs 23 and 31 and thereupon the locking bar 38 will be released to the influence of the spring 46 which will withdraw the same from contact with the thumb lever 35 and permit the same to fully return to its normal position into engagement with the shutter operating mechanism and upon the return of said bar 38 it will operate through the rod 41 to carry the cross bar 32 back into its original position. However it will usually happen that the spool 2 must be further turned to bring the film into proper position with the result that the lift bar 11 is again elevated and the mechanism thereby placed again under tension carrying the locking bar 38 again into active position to engage with and lock the thumb lever 35 when the next exposure occurs.

If it should happen that a film is in position for exposure exactly at the time the lug 12 drops into the depression 5 the camera will operate in the usual way but the shutter will not automatically lock against a double exposure.

When the camera is in position for use the front part thereof is pulled out including the lens and the housing enclosing the shutter operating mechanism as shown in Figure 1 traveling along the track 46, on the platform 6. When the camera is to be folded up, the front part thereof will be forced backwardly into the casing 1, the bellows 47 of the camera folding up to permit this, in the well known manner. When the camera is folded up the cross bar 32 will be carried back and will then rest against the web of the rear actuating bar 21 and will be operated by said bar, should the spool 2 be turned while the camera is folded up, to set the locking bar 38 into active position, or to permit the releasing of the same.

What we claim is:

1. In a camera, in combination, a shutter actuating device, a film spool, a tension member, a mechanism actuated by the spool and operating to place said member under tension, and a locking bar actuated by said tension member into engagement with said device to prevent two successive operations thereof.

2. In a camera, in combination, a shutter actuating device, a film spool, a shutter lock, and a mechanism normally held in active position, by said spool to actuate said lock to lock said device after it has been once operated, to prevent a second operation thereof said mechanism being releasable by the rotation of the spool.

3. In a camera, in combination, a shutter actuating device, a film spool, a shutter lock and a mechanism normally held in active position by said spool, to actuate said lock to lock said device, after it has been once operated, to prevent a second operation thereof said mechanism being releasable by the rotation of the spool, said spool being arranged to alternately release said mechanism, and to actuate the same into locking position.

4. In a camera, in combination, a shutter actuating device, a locking bar, a yieldable member arranged, when under tension to actuate said bar into locking engagement with said device, a film spool, and a mechanism operated by the spool to alternately place said member under tension and to release the same therefrom.

5. In a camera, in combination, a shutter actuating device, a tension rod, releasable means arranged to be actuated by said rod to lock said device against a second operation after it has been once operated and a film spool arranged to alternately release said rod from and place the same under tension.

6. In a camera, in combination, a shutter actuating device, a releasable tension rod arranged to lock said device against a second operation after it has been once operated, a film spool arranged to alternately release said tension rod and to place the same under tension, and an indicator operated by said rod and provided to indicate whether said means is in locking or released position.

In testimony whereof we have signed our names to this specification in the presence of two subscribing witnesses.

FREDERICK R. WARN.
PAUL C. JACKSON.

Witnesses:
Tom M. Taylor,
J. B. Duke.